United States Patent
Stevens et al.

(10) Patent No.: US 7,192,055 B2
(45) Date of Patent: Mar. 20, 2007

(54) PYROTECHNIC LINEAR INFLATOR

(75) Inventors: Bruce A. Stevens, Oakland, MI (US); Steven Maxwell-Gordon Dunham, Mt. Clemens, MI (US); Sean P. Burns, Almont, MI (US); Eduardo L. Quioc, Westland, MI (US); Jason Newell, LaSalle (CA)

(73) Assignee: Automotive Systems Laboratory, Inc., Armada, MI (US)

( * ) Notice: Subject to any disclaimer, the term of this patent is extended or adjusted under 35 U.S.C. 154(b) by 0 days.

(21) Appl. No.: 10/987,495

(22) Filed: Nov. 12, 2004

(65) Prior Publication Data

US 2005/0116454 A1    Jun. 2, 2005

Related U.S. Application Data

(60) Provisional application No. 60/519,880, filed on Nov. 13, 2003.

(51) Int. Cl.
*B60R 21/26* (2006.01)
(52) U.S. Cl. .............. 280/741; 280/736; 149/2
(58) Field of Classification Search ........ 280/736, 280/741, 740, 742; 102/530, 531, 283, 285, 102/288; 149/2; 264/3.1, 3.3; 60/255, 256
See application file for complete search history.

(56) References Cited

U.S. PATENT DOCUMENTS

| | | | |
|---|---|---|---|
| 3,188,802 A * | 6/1965 | Davies | ............ 60/255 |
| 3,397,639 A | 8/1968 | Alderfer | |
| 3,606,377 A | 9/1971 | Martin | |
| 3,721,456 A | 3/1973 | McDonald | |

(Continued)

FOREIGN PATENT DOCUMENTS

JP    5-64015    8/1993

OTHER PUBLICATIONS

U.S. Appl. No. 11/191,291, Khandhadia et al.

*Primary Examiner*—Ruth Ilan
(74) *Attorney, Agent, or Firm*—L.C. Begin & Associates, PLLC.

(57) ABSTRACT

An airbag inflator (10) including an elongated outer housing (12) having an interior and a plurality of orifices (22) extending collinearly therealong to enable fluid communication between the outer housing interior and an exterior of the outer housing (12). The outer housing orifice(s) (22) open from the outer housing interior toward a first side (F) of the inflator. An elongated inner housing (14) is positioned in the outer housing interior. The inner housing (14) has an interior and a plurality of orifices (20) extending collinearly therealong to enable fluid communication between the inner housing interior and an exterior of the inner housing (14). The inner housing orifice(s) (20) open from the inner housing interior toward a second side (S) of the inflator. A quantity of a gas generant composition (16) extends along a portion of the interior of the inner housing (14). The gas generant composition (16) has a substantially "C"-shaped cross-section with a slot (24) extending along the length of the gas generant composition (16). The gas generant slot (24) is oriented facing the inner housing orifice(s) (20). The slotted, "C"-shaped cross section of the gas generant (16) provides a greater exposed gas generant surface area than would be achievable without the slot (24). This enhances the ignition and burning of the gas generant composition (16) upon inflator activation.

17 Claims, 5 Drawing Sheets

U.S. PATENT DOCUMENTS

| | | | |
|---|---|---|---|
| 3,733,088 A | 5/1973 | Stephenson | |
| 3,799,573 A | 3/1974 | Olsson et al. | |
| 3,897,961 A | 8/1975 | Leising et al. | |
| 3,904,221 A | 9/1975 | Shild et al. | |
| 3,929,074 A | 12/1975 | San Miguel | |
| 3,986,808 A | 10/1976 | Keith | |
| 4,005,876 A | 2/1977 | Jorgensen et al. | |
| 4,012,211 A | 3/1977 | Goetz | |
| 4,200,615 A | 4/1980 | Hamilton et al. | |
| 4,322,385 A | 3/1982 | Goetz | |
| 4,358,998 A | 11/1982 | Schneiter et al. | |
| 4,846,368 A | 7/1989 | Goetz | |
| 4,878,690 A | 11/1989 | Cunningham | |
| 4,890,860 A | 1/1990 | Schneiter | |
| 4,950,458 A | 8/1990 | Cunningham | |
| 5,058,921 A * | 10/1991 | Cuevas | 280/736 |
| 5,094,475 A | 3/1992 | Olsson et al. | |
| 5,109,772 A | 5/1992 | Cunningham et al. | |
| 5,139,588 A | 8/1992 | Poole | |
| 5,211,224 A * | 5/1993 | Bouldin | 166/63 |
| 5,294,414 A * | 3/1994 | Brede et al. | 280/736 |
| 5,308,370 A | 5/1994 | Kraft et al. | |
| 5,322,322 A | 6/1994 | Bark et al. | |
| 5,409,259 A | 4/1995 | Cunningham et al. | |
| 5,439,250 A | 8/1995 | Kokeguchi et al. | |
| 5,443,286 A | 8/1995 | Cunningham et al. | |
| 5,462,308 A | 10/1995 | Seki et al. | |
| 5,464,249 A | 11/1995 | Lauritzen et al. | |
| 5,503,079 A | 4/1996 | Kishi et al. | |
| 5,540,154 A | 7/1996 | Wilcox et al. | |
| 5,540,459 A | 7/1996 | Daniel | |
| 5,542,704 A | 8/1996 | Hamilton et al. | |
| 5,547,638 A | 8/1996 | Rink et al. | |
| 5,562,303 A | 10/1996 | Schleicher et al. | |
| 5,573,271 A | 11/1996 | Headley | |
| 5,588,672 A | 12/1996 | Karlow et al. | |
| 5,623,115 A | 4/1997 | Lauritzen et al. | |
| 5,626,360 A | 5/1997 | Lauritzen et al. | |
| 5,635,665 A | 6/1997 | Kishi et al. | |
| 5,743,556 A | 4/1998 | Lindsey et al. | |
| 5,743,559 A * | 4/1998 | Nakajima et al. | 280/741 |
| 5,827,996 A | 10/1998 | Yoshida et al. | |
| 5,845,933 A | 12/1998 | Walker et al. | |
| 5,868,424 A | 2/1999 | Hamilton et al. | |
| 5,871,228 A | 2/1999 | Lindsey et al. | |
| 5,941,563 A * | 8/1999 | Schoenborn | 280/740 |
| 5,967,550 A | 10/1999 | Shirk et al. | |
| 6,019,861 A | 2/2000 | Canterberry et al. | |
| 6,029,994 A | 2/2000 | Perotto et al. | |
| 6,032,979 A | 3/2000 | Mossi et al. | |
| 6,039,820 A | 3/2000 | Hinshaw et al. | |
| 6,051,158 A | 4/2000 | Taylor et al. | |
| 6,056,319 A | 5/2000 | Ruckdeschel et al. | |
| 6,062,143 A | 5/2000 | Grace et al. | |
| 6,077,371 A | 6/2000 | Lundstrom et al. | |
| 6,142,518 A | 11/2000 | Butt et al. | |
| 6,145,876 A | 11/2000 | Hamilton | |
| 6,170,867 B1 | 1/2001 | Rink et al. | |
| 6,176,517 B1 | 1/2001 | Hamilton et al. | |
| 6,177,028 B1 | 1/2001 | Kanda et al. | |
| 6,299,203 B1 * | 10/2001 | Muller | 280/736 |
| 6,315,847 B1 | 11/2001 | Lee et al. | |
| 6,347,566 B1 | 2/2002 | Rabotinsky et al. | |
| 6,416,599 B1 | 7/2002 | Yoshikawa et al. | |
| 6,497,429 B2 | 12/2002 | Matsumoto | |
| 6,595,547 B2 | 7/2003 | Smith | |
| 6,601,871 B2 | 8/2003 | Fischer | |
| 6,688,231 B1 | 2/2004 | Herrmann | |
| 6,752,421 B2 | 6/2004 | Khandhadia et al. | |
| 6,755,438 B2 | 6/2004 | Rink et al. | |
| 6,805,377 B2 | 10/2004 | Krupp et al. | |
| 6,846,013 B2 | 1/2005 | Smith | |
| 2004/0084885 A1 | 5/2004 | Burns et al. | |
| 2005/0104349 A1 | 5/2005 | Stevens et al. | |
| 2005/0116454 A1 | 6/2005 | Stevens | |
| 2005/0151358 A1 | 7/2005 | Burns | |
| 2005/0200103 A1 | 9/2005 | Burns et al. | |
| 2005/0218338 A1 | 10/2005 | Burns et al. | |
| 2005/0218637 A1 | 10/2005 | Burns | |
| 2006/0022444 A1 | 2/2006 | Khandhadia | |

\* cited by examiner

PYROTECHNIC LINEAR INFLATOR

CROSS REFERENCE TO RELATED APPLICATIONS

This application claims the benefit of provisional application Ser. No. 60/519,880, filed on Nov. 13, 2003.

BACKGROUND OF THE INVENTION

The present invention relates to inflators for vehicle airbags and, more particularly, to a linear inflator which discharges inflation gas along the length of the inflator for use in side impact or head curtain airbag systems.

Typical side impact or head curtain airbag modules use one or more standard airbag inflators discharging into a distribution pipe for delivering the gas to the bag. There are pressure losses associated with gas flow through the distribution pipe, resulting in lower system efficiencies. In addition, extra space inside the vehicle is required to house the inflator portion of the devices.

SUMMARY OF THE INVENTION

In accordance with the present invention, an airbag inflator is provided which includes an elongated outer housing having an interior and a plurality of orifices to enable fluid communication between the outer housing interior and an exterior of the outer housing. The outer housing orifice(s) open from the outer housing interior toward a first side of the inflator. An elongated inner housing is positioned in the outer housing interior. The inner housing has an interior and a plurality of orifices to enable fluid communication between the inner housing interior and an exterior of the inner housing. The inner housing orifice(s) open from the inner housing interior toward a second side of the inflator. A quantity of a gas generant composition extends along a portion of the interior of the inner housing. The gas generant has a substantially "C"-shaped cross-section with a slot extending along the length of the gas generant. The gas generant slot is oriented facing the inner housing orifice(s). A filter is positioned intermediate the inner housing orifice(s) and the outer housing orifice(s) for filtering combustion products generated by combustion of the gas generant composition. An igniter is operatively coupled to the gas generant composition so as to enable fluid communication between the igniter and the gas generant composition upon activation of the inflator.

Upon a crash event, a signal from a crash sensor is conveyed to the igniter, thereby activating the igniter and igniting gas generant. Inflation gas produced by combustion of the gas generant proceeds out of the inner housing orifice(s) and flows around either side of the inner housing and also through the filter. The inflation gas then exits the inflator via the outer housing orifice(s) to inflate the airbag.

The slotted, "C"-shaped cross section of the gas generant provides a greater exposed gas generant surface area than would be achievable without the slot. This enhances the ignition and burning of the gas generant composition upon inflator activation, while also providing fluid communication between a relatively large surface area of gas generant and the inner housing orifice(s). The present inflator is also self-contained, generating and discharging gas uniformly along its length without the need for a separate conventional inflator connected to a distribution pipe. This reduces the overall size envelope of the inflator. The inflator of the present invention is also lower in cost and simpler to manufacture than many known designs.

BRIEF DESCRIPTION OF THE DRAWINGS

FIG. 2A is a cross-sectional side view of an embodiment of an igniter assembly incorporated into the inflator of the present invention;

FIG. 3 is a cross-sectional end view of a gas generant strip incorporated into an inner housing of the present invention;

FIG. 8 is a schematic representation of an exemplary vehicle occupant restraint system incorporating an inflator in accordance with the present invention.

DETAILED DESCRIPTION

Figure 1:
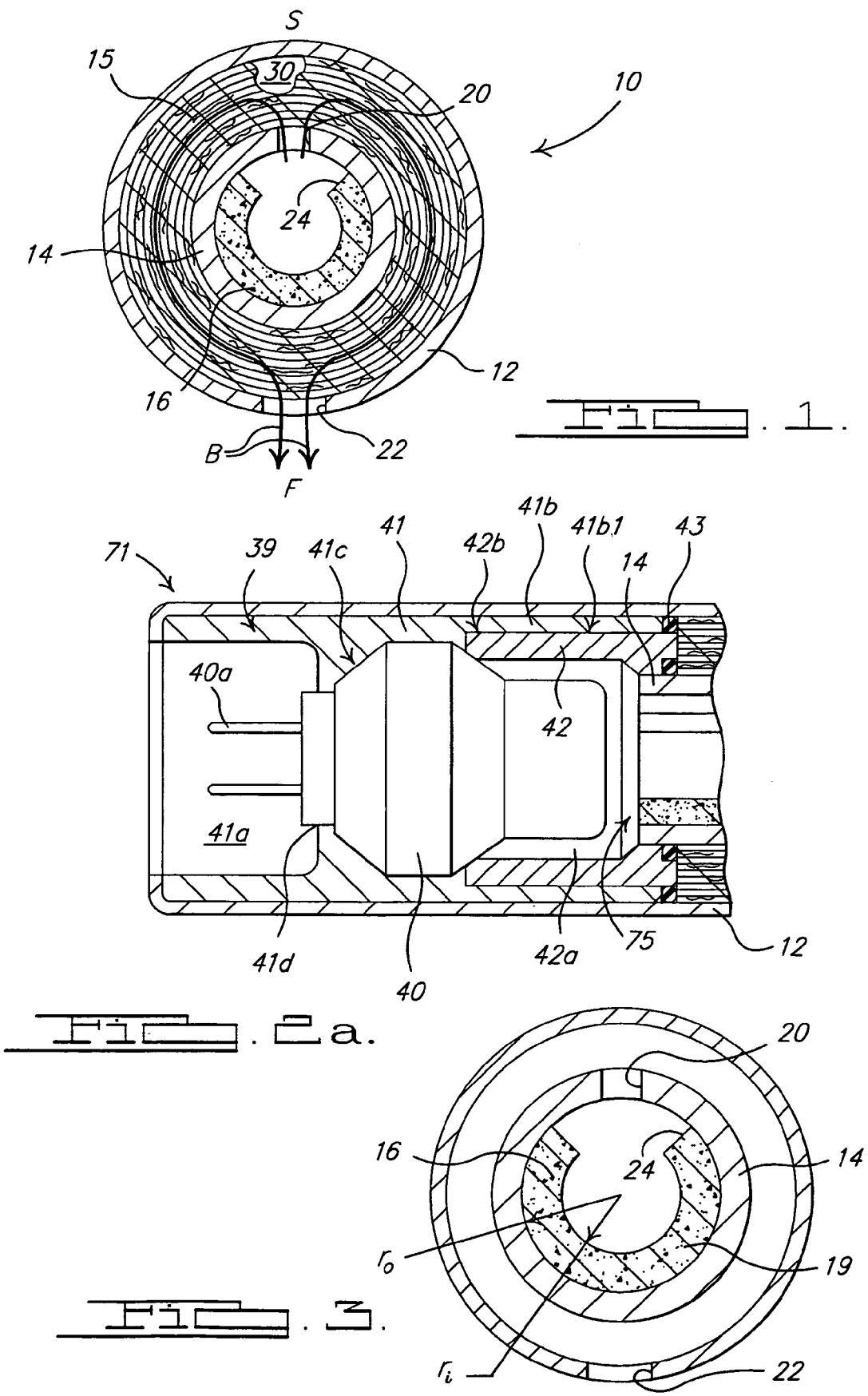
FIG. 1 is a cross-sectional end view of one embodiment of an inflator in accordance with the present invention.
Figure 2:
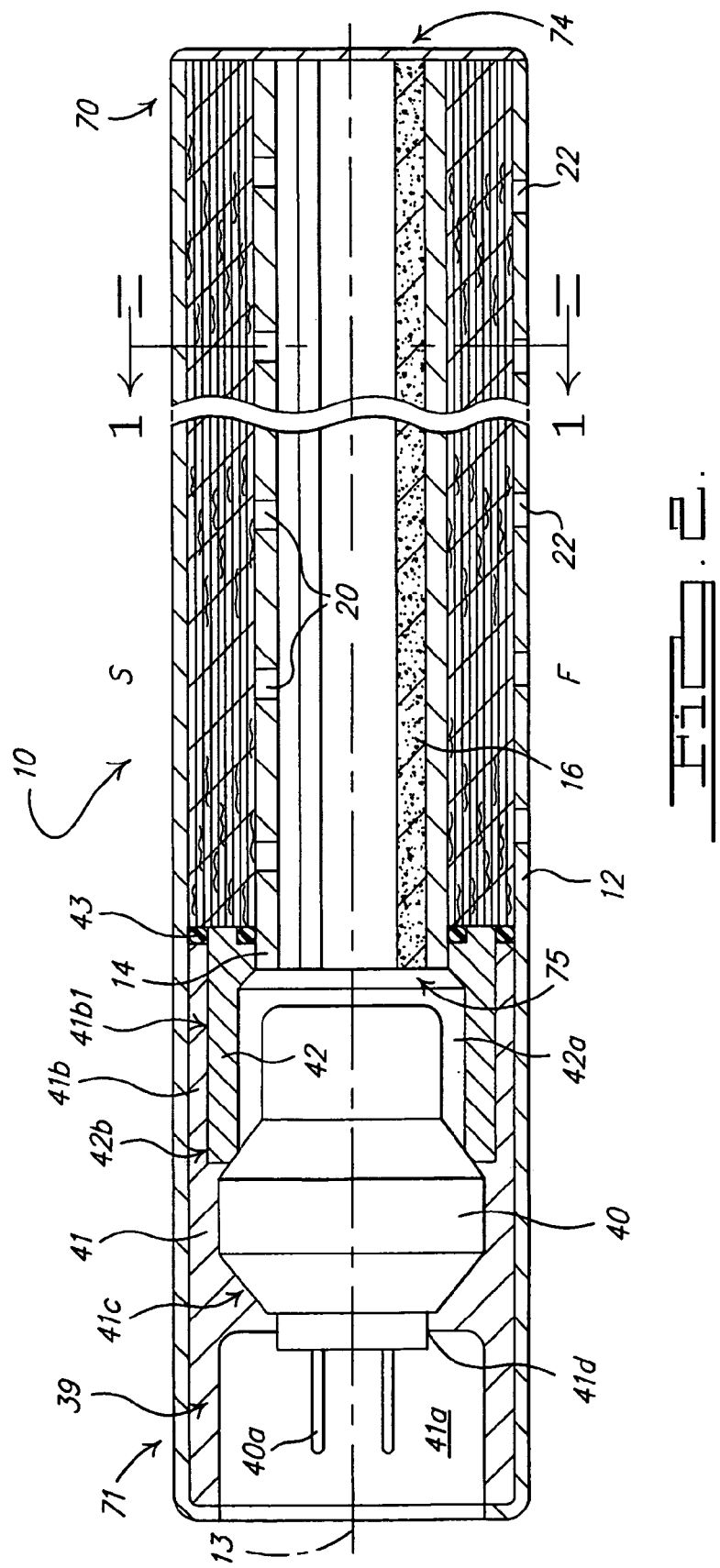
FIG. 2 is a cross-sectional side view of the embodiment of the inflator shown in FIG. 1.

FIGS. 1 and 2 show cross-sectional view of an inflator 10 in accordance with the present invention. Inflator 10 includes an elongated outer housing 12 and an elongated inner housing 14 positioned in an interior of outer housing 12, thereby forming a cavity 30 between inner housing 14 and outer housing 12. All the component parts of inflator 10 are manufactured from materials and with processes known in the art.

Outer housing 12 includes a first end 70, a second end 71, and a longitudinal axis 13. Outer housing 12 has one or more orifices 22 formed therealong to enable fluid communication between the interior and the exterior of the outer housing. Orifice(s) 22 are adapted to convey gas produced by the combustion of a gas generant composition to an associated airbag (not shown). In the embodiment shown in FIGS. 1 and 2, orifice(s) 22 are aligned along the length of outer housing 12. Orifice(s) 22 also open from the outer housing interior toward a first side (designated "F") of the inflator. Orifice(s) 22 may be formed as one or more longitudinal slits extending along outer housing 12, or the orifice(s) may be formed as holes spaced along outer housing 12. Outer housing 12 may be fabricated using any one of a variety of know processes, such as extrusion or roll forming. Outer housing 12 is preferably made from a metal or metal alloy, for example, steel or aluminum. Alternatively, outer housing 12 may be made from polymers or other suitable materials.

Inner housing 14 is positioned substantially coaxially with outer housing 12 and includes a first end 74 and a second end 75 opposite first end 74. Inner housing 14 also has an interior and one or more orifices 20 formed therealong. Orifice(s) 20 are adapted to convey gas produced by the combustion of a gas generant composition to cavity 30. In one embodiment, orifice(s) 20 are aligned along the length of inner housing 14. Orifice(s) 20 also open from the inner housing interior toward a second side (designated "S") of the inflator. Orifice(s) 20 may be formed as one or more longitudinal slits extending along inner housing 14, or the orifice(s) may be formed as holes spaced along inner housing 14. Inner housing 14 may be fabricated using any one of a variety of know processes, such as extrusion or roll forming. Inner housing 14 is preferably made from a metal or metal alloy, for example, steel or aluminum. Alternatively, inner housing 14 may be made from polymers or other suitable materials.

In the embodiment shown in FIGS. 1 and 2, inner housing 14 is positioned coaxial with outer housing 12. In addition, as seen in FIGS. 1 and 2, second side S of inflator 10 is opposite first side F of the inflator. The arrangement of the respective outer and inner orifices toward opposite sides of the inflator maximizes filter efficacy by forcing the inflation gas produced during inflator activation to flow out of inner housing orifices 20, around inner housing 14, and out of inflator 10 through outer housing orifices 22. In flowing from inner housing orifices 20 to outer housing orifices 22, the inflation gas stream becomes bifurcated, a portion of the stream flowing around one side of inner housing 14, and another portion of the stream flowing around an opposite side of the inner housing, as indicated by arrows "B" of FIG. 2. Positioning inner housing orifice(s) 20 opposite outer housing orifice(s) 22 provides substantially equal filtration of each portion of the stream, by placing outer housing orifice(s) 22 an equal distance from inner housing orifice(s) along either side of inner housing 14.

Referring to FIG. 3, a quantity of a gas generant composition 16 extends along the interior of inner housing 14. A pyrotechnic is ignitable to produce an inflation gas for inflating an airbag (not shown) in a vehicle occupant restraint system. In the embodiment shown, gas generant composition 16 is substantially coextensive with inner housing 14. Gas generant 16 has a substantially "C"-shaped cross-section with a slot 24 extending along the length of the gas generant. In a preferred embodiment, opening 24 is oriented toward orifice(s) 20 in inner housing 14.

The "C"-shaped cross section of gas generant 16 provides a greater exposed gas generant surface area than would be achievable without the slot. This enhances the ignition and burning of the gas generant composition upon inflator activation, while also providing fluid communication between a relatively large surface area of gas generant 16 and inner housing orifice(s) 20.

Referring to FIGS. 1 and 3, in a particular embodiment, the substantially "C"-shaped cross-section of gas generant 16 defines a cylindrical wall 19 having an outer surface with an outer radius $r_o$ and an inner surface with an inner radius $r_i$, with slot 24 extending through wall 19. In this embodiment, the total surface area A of the gas generant block of FIGS. 1 and 2 is approximated by the relation:

$$A = L(X(r_o+r_i)+2(r_o-r_i))+X(r_o^2-r_i^2) \quad (1)$$

where:
L=the length of the gas generant block;
$r_o$=the outer radius of the wall;
$r_i$=the inner radius of the wall; and
X=an arc length occupied by the cylindrical wall, in radians.

As a comparative example, for $r_o$=0.25 inches, $r_i$=0.15 inches, L=10 inches, and X=5/3 π radians:

$$A = 10(5/3\ \pi(0.25+0.15)+2(0.25-0.15))+5/3\pi(0.25^2-0.15^2)=23.15\ \text{in.}^2$$

In contrast, the surface area of a solid cylinder is given by the relation $$2\pi rL \quad (2)$$

where r is the radius of the cylinder and L is the length of the cylinder. For a solid cylinder with the dimensions given above, the surface area is $2\pi(0.25)(10)=15.71$ in.$^2$. Thus, it may be seen that the gas generant geometry shown in FIG. 3 provides a larger overall surface area for a given size envelope of gas generant than a solid cylinder would provide.

In one embodiment (shown in FIG. 4), gas generant 16 is in the form of a strip comprising a unitary, longitudinal block. By forming gas generant 16 as a unitary block, greater control of the gas generant geometry inside inner housing 14 may be achieved. This results in more controllable and predictable gas generant combustion propagation. Ease of handling of the gas generant composition during assembly of the inflator is also promoted.

Figure 4:
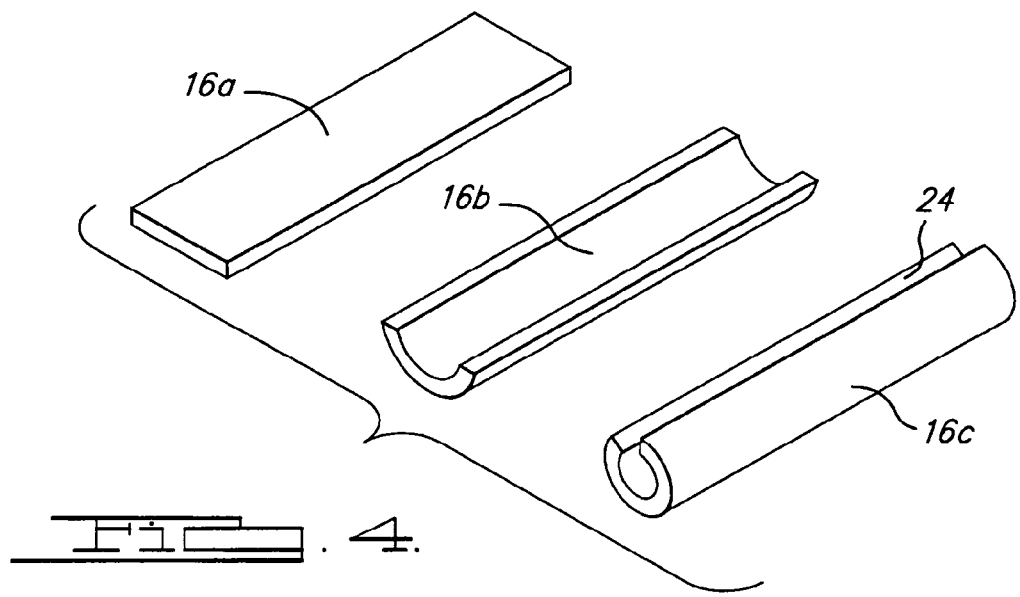
FIG. 4 shows perspective views of various embodiments of gas generant strips in accordance with the present invention.

FIG. 4 shows perspective views of extruded strips of gas generant 16a–c in accordance with the present invention. Gas generant strip 16a is an elongate, substantially rectangular strip that may be placed in an interior of inner housing 14 and deformed to have a substantially C-shaped cross section, as illustrated by strips 16b and 16c. Strip 16c has a more completely closed shape (i.e., a slot 24 with a smaller opening) than strip 16b, corresponding to a relatively greater quantity of gas generant, as might be formed when incorporating and deforming a relatively larger flat strip 16a. In alternative embodiments, the gas generant is extruded having the desired final cross sectional curvature, rather than being extruded as a flat strip and subsequently deformed.

Figure 5:
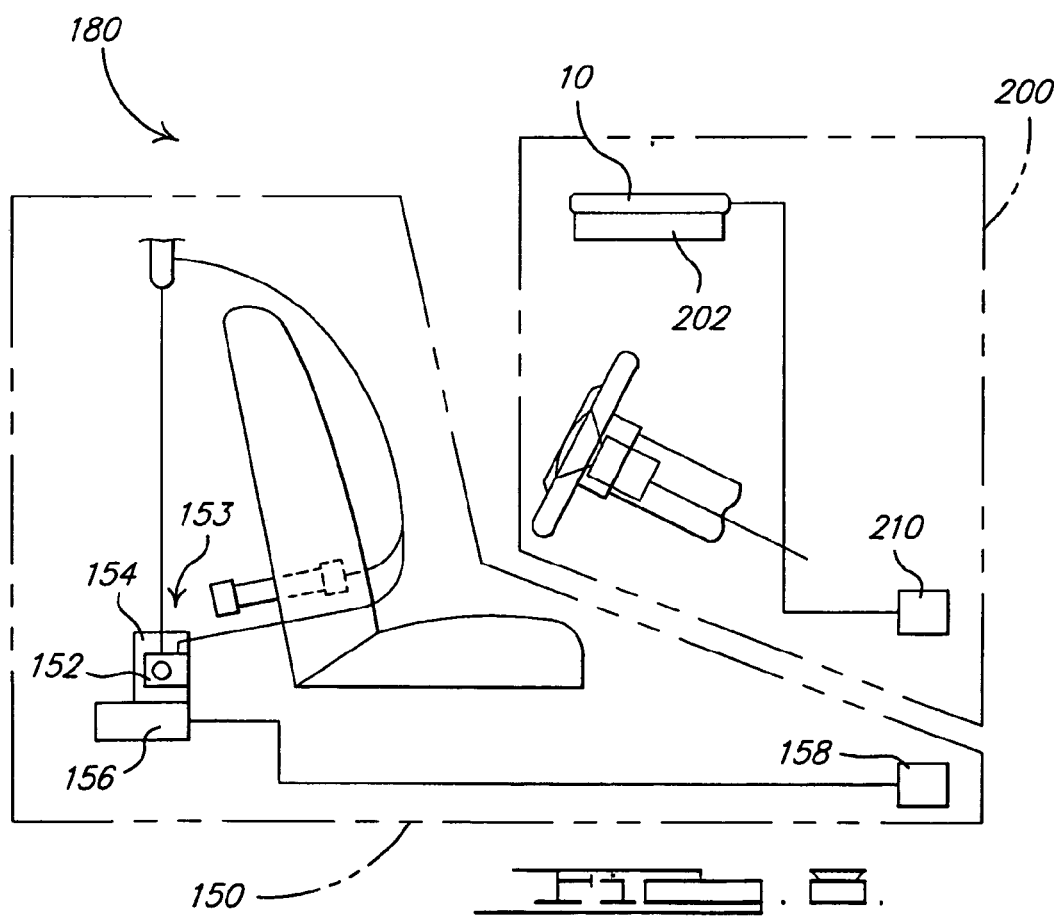
FIG. 5 is a cross-sectional side view of a second embodiment of the inflator of the present invention.

In another alternative embodiment, shown in FIG. 5, gas generant composition 16 is in the form of a plurality of wafers 16e stacked longitudinally along the interior of inner housing 14. Each of gas generant wafers 16e has a substantially "C"-shaped cross-section with a slot 24 formed therein, as previously described. Slots 24 of individual wafers 16e are aligned longitudinally along the length of inner housing 14 to provide, in combination, a slot extending along the length of the gas generant as previously described.

The combustion rate of gas generant 16 can also be affected by varying the L/D ratio of the gas generant, which is defined as the ratio of the gas generant length to the gas generant outer diameter. More specifically, a relatively longer, narrower (high L/D ratio) gas generant strip will burn more rapidly and evenly than a thicker strip (i.e., a strip with a larger diameter). Thus, if it is desired to increase the amount of inflation gas generated for a particular application, the length of the gas generant extending along inner housing 14 may be increased without increasing the outer diameter of the gas generant. It is believed that maintaining a ratio of length-to-outer diameter of at least 10:1 provides rapid and efficient combustion propagation for the applications described herein.

Gas generant composition 16 is a fast burning, relatively easily ignitable composition. In one embodiment, gas generant 16 comprises silicone as a fuel at about 10–25% by weight; a perchlorate oxidizer such as ammonium, lithium, or potassium perchlorate; and a strontium salt such as strontium nitrate or strontium carbonate as a coolant. The oxidizer and coolant typically comprise about 75–90% by weight of the propellant. The silicone may be purchased, for example, from General Electric or other well-known suppliers. Silicone provides the additional benefit of acting as a binder, facilitating the extrusion of gas generant strips or ribbons, as described herein. The other gas generant constituents may be provided by suppliers or by manufacturing methods well known in the art. Exemplary suitable compositions are disclosed in U.S. Patent Application Publication No. 2001/0045735, Ser. No. 09/846,004, incorporated by reference herein.

In alternative embodiments, the gas generant composition can be made to incorporate fast burning and slow burning compositions, with the fast burning portion on the inside surface of the extrusion, as installed into inner housing 14. The fast burning composition supports the ignition mechanism and produces the gas necessary for initial airbag inflation. The slow burning composition is ignited by the fast burning layer and provides a relatively slow generation of gas necessary for long term inflation applications, such as roll-over airbags.

Referring again to FIGS. 1 and 2, a metallic mesh filter 15 is positioned in the cavity formed between outer housing 12 and inner housing 14, between inner housing orifice(s) 20 and outer housing orifice(s), for filtering particulate materials produced during inflator activation, as well as serving as a heat sink for hot inflation gases. Suitable metallic mesh is readily obtainable from suppliers such as Wayne Wire, Inc., of Kalkaska, Mich.

Referring to FIG. 2, an igniter 40 operatively coupled to gas generant composition 16 so as to enable fluid communication between the igniter and the gas generant composition upon activation of the inflator. In the embodiment shown, igniter 40 is coupled to an end of inner housing 14. Igniter 40 may be formed as known in the art. One exemplary igniter construction is described in U.S. Pat. No. 6,009,809, incorporated herein by reference.

Igniter 40 is coupled to the inflator structure in a manner designed to minimize inflation gas pressure loss through the igniter end of the inflator upon activation of the inflator. Referring to FIG. 2A, in a preferred embodiment, igniter 40 is incorporated within an igniter assembly 39 secured within outer housing 12. Igniter assembly 39 includes an outer sleeve 41, igniter 40, and an igniter insert 42. Outer sleeve 41 defines a rear cavity 41a for receiving a mating interconnect or other suitable electrical interface for connection to igniter terminals 40a. Outer sleeve 41 also includes an annular wall 41b defining a front cavity 41c and an orifice 41d enclosed by wall 41b for receiving igniter 40 and igniter insert 42 therein. An inner surface 41b-1 of annular wall 41b is threaded for mating engagement with complementary threads formed along an outer surface of igniter insert 42, as described below.

Igniter insert 42 includes an orifice 42a extending through a central portion of the insert for receiving a portion of igniter 40 therein. An annular wall 42b encloses orifice 42a. An outer surface of annular wall 42b is threaded for mating engagement with complementary threads formed along inner surface 41b-1 of outer sleeve 41, as previously described.

Igniter 40 may be inserted into outer sleeve orifice 41d and secured in outer sleeve 41 using one of a number of known methods, such as crimping, adhesive application, forming of an interference fit, etc. When igniter 40 is secured within outer sleeve 41, igniter insert 42 is screwed into outer sleeve front cavity 41c. It is believed that threaded engagement between igniter insert 42 and outer sleeve 41 minimizes inflation gas pressure loss through the interface between igniter insert 42 and outer sleeve 41.

Additional seals may be formed at interfaces between the igniter assembly components and between igniter assembly 39 and other components of the inflator. In one embodiment, shown in detail in FIG. 2A, annular cavities for accommodating O-ring seals 43 are provided in outer sleeve 41 and igniter insert 42, adjacent the interfaces between inner housing 14 and igniter insert 42, between filter 15 and igniter insert 42, between filter and outer sleeve 41, and between outer housing 12 and outer sleeve 41. These seals aid in minimizing pressure losses from the inflator. Igniter assembly 39 may then be secured within outer housing 12 by, for example, an interference fit formed between the outer housing and outer sleeve 41. An end portion of outer housing 12 is then crimped over outer sleeve 41 to secure the outer sleeve within the outer housing.

Operation of the inflator will now be discussed with reference to FIGS. 1 and 2.

Upon a crash event, a signal from a crash sensor (not shown) is conveyed to igniter 40, thereby activating the igniter and igniting gas generant 16. Upon activation of igniter 40, ignition of the gas generant 16 progresses rapidly from inner housing end 75 toward inner housing end 74. A pressure wave produced by igniter 40 progresses down the length of the inside surface of gas generant 16, igniting the propellant as it passes. The gas generant ignites rapidly, feeding the pressure wave. By utilizing a gas generant having the disclosed composition and shape, an ignition cord is not required, as in certain known designs. Moreover, the substantially C-shaped cross section of gas generant 16 provides for a relatively smooth ignition of the gas generant. Due to the pressure sensitivity of some propellants, this shape imparts considerable advantages. Inflation gas produced by combustion of gas generant 16 proceeds out of inner housing orifice(s) 20 and flows around either side of inner housing 14 and also through filter 15. The inflation gas then exits the inflator via outer housing orifice(s) 22. Arrows "B" in FIG. 1 illustrate an approximate direction of gas flow upon inflator activation.

Figure 6:
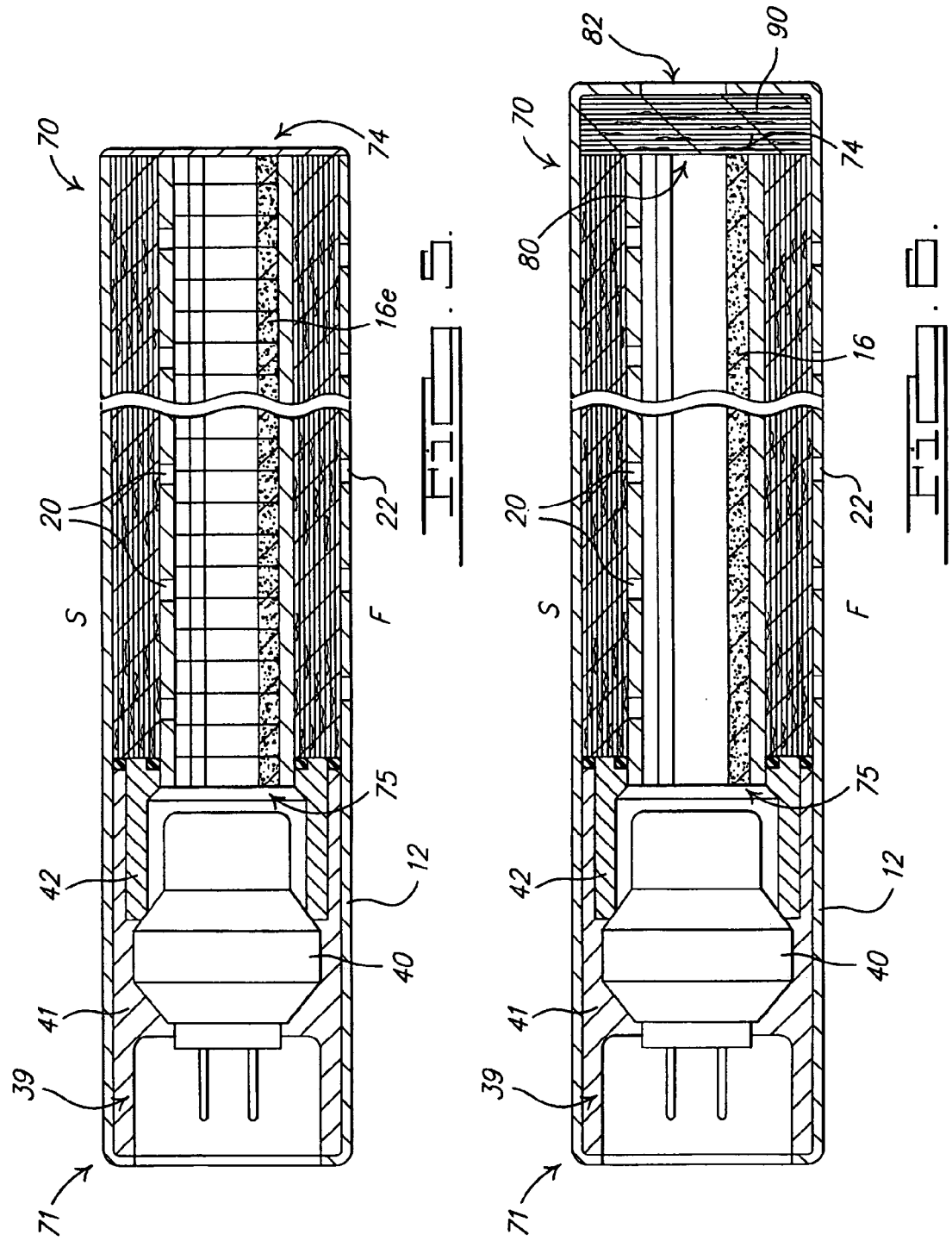
FIG. 6 is a cross-sectional side view of a third embodiment of the inflator of the present invention.
Figure 7:
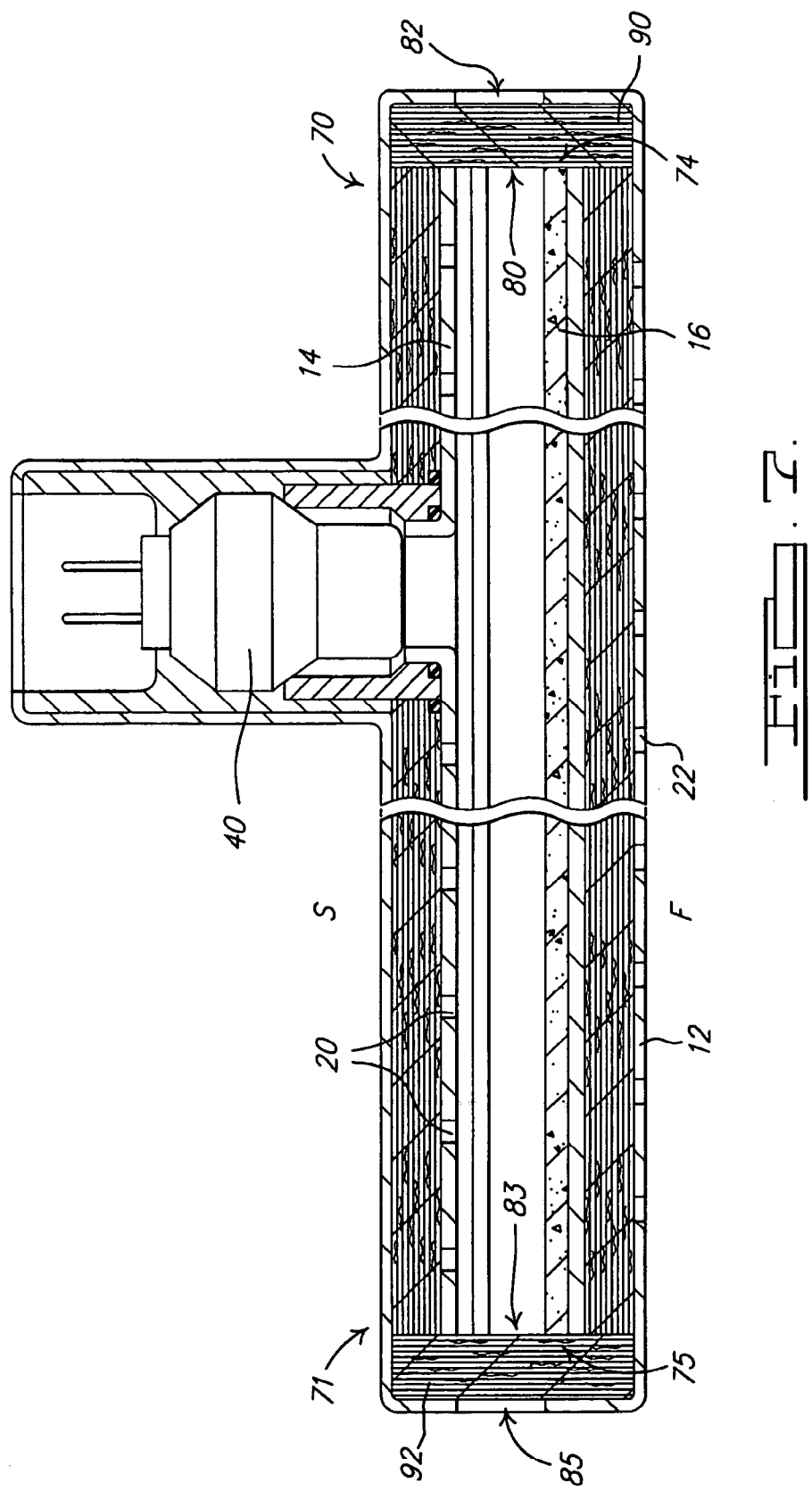
FIG. 7 is a cross-sectional side view of a fourth embodiment of the inflator of the present invention.

In other alternative embodiments, flow of inflation gases may also be directed axially (along the longitudinal axis of the inflator) as well as radially outward from the inflator. This enables portions of certain airbag configurations to be filled more rapidly than would be the case with purely radial inflation gas flow. FIGS. 6 and 7 show embodiments of inflators in accordance with the present invention that incorporate an axial flow component.

Referring to FIG. 6, in one embodiment, inner housing 14 includes an aperture 80 formed in first end 74 of the housing. Similarly, outer housing 12 includes an aperture 82 formed in first end 70 of outer housing 12. A filter 90 is positioned intermediate inner housing first end aperture 80 and outer housing first end aperture 82 for filtering combustion products generated by combustion of gas generant composition 16 within inner housing 14. Upon activation of the inflator, inflation gases generated by combustion of gas generant composition 16 flow from inner housing first end aperture 80 through filter 90 to exit outer housing first end aperture 82, and into an associated airbag (not shown).

FIG. 7 shows another embodiment of the inflator in which inflation gases generated in inner housing 14 flow out of both ends of the inflator, as well as radially out of the inflator. In this embodiment, an additional aperture 83 is formed in second end 75 of inner housing 14, and an additional aperture 85 is formed in second end 71 of outer housing 12. Another filter 92 is positioned intermediate inner housing second end aperture 83 and outer housing second end aperture 85 for filtering combustion products generated by combustion of the gas generant composition. Upon activation of the inflator, inflation gases generated by combustion of gas generant composition 16 flow from inner housing second end aperture 83 through filter 92 to exit the inflator via outer housing second end aperture 85. Igniter 40 is positioned intermediate inner housing first end 74 and inner housing second end 75, approximately at a midpoint of the gas generant, so that combustion propagation of gas generant 16 proceeds toward either end of inner housing 14 and finishes substantially simultaneously.

Referring now to FIG. 8, any of the Inflator embodiments described above may also be incorporated into an airbag system 200. Airbag system 200 includes at least one airbag 202 and an inflator 10 coupled to airbag 202 so as to enable fluid communication with an interior of the airbag. As described above, inflator 10 incorporates a longitudinal gas generant arrangement 16 comprising a unitary, longitudinal block having a slot 24 extending along a length thereof and a substantially "C"-shaped cross-section, a housing structure enclosing gas generant strip 16, and an igniter 40 operatively coupled to gas generant strip 16 so as to enable fluid communication between igniter 40 and gas generant strip 16 upon activation of the inflator. Airbag system 200 may also be in communication with a crash event sensor 210 including a known crash sensor algorithm that signals actuation of airbag system 200 via, for example, activation of airbag inflator 10 in the event of a collision.

Referring again to FIG. 8, airbag system 200 may also be incorporated into a broader, more comprehensive vehicle occupant restraint system 180 including additional elements such as a safety belt assembly 150. FIG. 8 shows a schematic diagram of one exemplary embodiment of such a restraint system.

Safety belt assembly 150 includes a safety belt housing 152 and a safety belt in accordance with the present invention extending from housing 152. A safety belt retractor mechanism 154 (for example, a spring-loaded mechanism) may be coupled to an end portion 153 of the belt. In addition, a safety belt pretensioner 156 may be coupled to belt retractor mechanism 154 to actuate the retractor mechanism in the event of a collision. Typical seat belt retractor mechanisms which may be used in conjunction with the safety belt embodiments of the present invention are described in U.S. Pat. Nos. 5,743,480, 5,553,803, 5,667,161, 5,451,008, 4,558,832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt system 150 may be in communication with a crash event sensor 158 (for example, an inertia sensor or an accelerometer) including a known crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It is contemplated that the present invention will find primary application in side impact or head curtain airbag systems; however, it is not limited thereto. It will also be understood that the foregoing description of an embodiment of the present invention is for illustrative purposes only. As such, the various structural and operational features herein disclosed are susceptible to a number of modifications commensurate with the abilities of one of ordinary skill in the art, none of which departs from the scope of the present invention as defined in the appended claims.

The invention claimed is:

1. An inflator comprising:
   an elongated outer housing having an interior and a plurality of orifices to enable fluid communication between the outer housing interior and an exterior of the outer housing, all of the orifices of the plurality of outer housing orifice extending substantially collineary along the outer housing, the plurality of outer housing orifices opening from the outer housing interior toward a first side of the inflator;
   an elongated inner housing positioned in the outer housing interior, the inner housing having an interior and a plurality of orifices to enable fluid communication between the inner housing interior and an exterior of the inner housing, all of the orifices of the plurality of inner housing orifices extending substantially collinearly along the inner housing, the plurality of inner housing orifices opening from the inner housing interior toward a second side of the inflator,
   a quantity of a gas generant composition extending along at least a portion of the interior of the inner housing, the gas generant composition having a length and a substantially "C"-shaped cross-section with a slot extending along the length of the gas generant composition; and
   an igniter operatively coupled to the gas generant composition, thereby initiating combustion of the gas generant composition upon activation of the inflator,
   wherein the inner housing includes a first end, a second end opposite the first end, and an aperture formed in the inner housing first end;
   the outer housing includes a first end proximate the inner housing first end, a second end proximate the inner housing second end, and an aperture formed in the outer housing first end; and
   a filter is positioned intermediate the inner housing first end aperture and the outer housing first end aperture for filtering combustion products generated by combustion of the gas generant composition whereby, subsequent to activation of the inflator, inflation gases generated by combustion of the gas generant composition flow from the inner housing first end aperture through the second filter to exit the outer housing first end aperture.

2. A vehicle occupant restraint system including the inflator of claim 1.

3. The inflator of claim 1 wherein the gas generant composition is formed into a unitary block.

4. The inflator of claim 1 wherein the inner housing has a longitudinal axis and the gas generant composition comprises a plurality of wafers stacked along the longitudinal axis.

5. The inflator of claim 1 wherein the inner housing is positioned coaxial with the outer housing.

6. The inflator of claim 1 wherein the substantially "C"-shaped cross-section defines an cylindrical wall having an outer radius and an inner radius, and wherein the slot extends through the wall.

7. The inflator of claim 6 wherein the gas generant has an outer diameter, a length, and a ratio length-to-outer diameter of at least 10:1.

8. The inflator of claim 1 wherein the second side of the inflator is substantially opposite the first side of the inflator.

9. The inflator of claim 1 wherein the gas generant composition is substantially coextensive with the inner housing.

10. The inflator of claim 1 wherein the slot formed along the gas generate composition is in communication with the plurality of inner housing orifices.

11. The inflator of claim 1 further including an aperture formed in the second end of the inner housing, an aperture formed in the second end of the outer housing, and a filter positioned intermediate the inner housing second end aperture and the outer housing second end aperture for filtering combustion products generated by combustion of the gas generant composition whereby, subsequent to activation of the inflator, inflation gases generated by combustion of the gas generant composition flow from the inner housing second end aperture through the filter to exit the outer housing second end aperture.

12. The inflator of claim 11 wherein the igniter is positioned intermediate the inner housing first end and the inner housing second end.

13. The inflator of claim 1 wherein the igniter is positioned proximate the second end of the inner housing.

14. The inflator of claim 1 wherein the igniter is incorporated into an igniter assembly including a threaded sleeve defining a cavity for receiving the igniter therein and a threaded insert adapted for threaded engagement with the threaded sleeve, for attenuating an inflation gas pressure loss through an interface between the insert and the sleeve.

15. An airbag system comprising the inflator of claim 1 and at least one airbag coupled to the inflator thereby providing fluid communication between the inflator and an interior of the airbag upon activation of the inflator.

16. The airbag system of claim 15 wherein the at least one airbag is a side curtain airbag.

17. The airbag system of claim 15 wherein the at least one airbag is a head curtain airbag.

* * * * *